United States Patent [19]

Elebracht et al.

[11] 3,865,555
[45] Feb. 11, 1975

[54] REACTOR FOR CATALYTIC GAS PHASE OXIDATION

[75] Inventors: Gunter Elebracht; Gunter Siekmann, both of Brackwede, Germany

[73] Assignee: Rheinstahl AG, Essen, Germany

[22] Filed: June 7, 1973

[21] Appl. No.: 367,784

[30] Foreign Application Priority Data

June 28, 1972 Germany.............................. 2231557

[52] U.S. Cl................ 23/288 R, 23/288 M, 55/509, 261/94, 260/515 P
[51] Int. Cl.............................................. B01j 9/04
[58] Field of Search........ 23/288 M, 288 R; 55/504, 55/507, 509, 490; 261/94, 95, 96, 97, 98

[56] References Cited
UNITED STATES PATENTS

| | | | |
|---|---|---|---|
| 1,953,786 | 4/1934 | Sullivan | 55/509 X |
| 3,034,869 | 5/1962 | Peterson | 23/288 M |
| 3,218,048 | 11/1965 | Smith, Jr. et al. | 261/94 |
| 3,453,087 | 7/1969 | Herp, Jr. et al. | 23/288 M |
| 3,617,227 | 11/1971 | Beggs | 23/288 M |
| 3,762,465 | 10/1973 | Gutlhuber | 23/288 M UX |

*Primary Examiner*—James H. Tayman, Jr.
*Attorney, Agent, or Firm*—McGlew and Tuttle

[57] ABSTRACT

A reactor for catalytic gas phase oxidation includes a tube bundle of contact tubes extending between and having their respective ends seated in tube sheets in a vessel in which a reaction gas is passed through the tubes and a heat carrier is circulated around the exterior of the tubes. Each contact tube is filled with catalyst particles of relatively small size, and holding means are arranged in each tube end in order to hold the particles therein. The holding means comprise a layer or skein of wire gauze arranged adjacent each end and held in position by a clamping ring which may be formed as a spring ring which is engaged against the walls of the tube or a ring which engages in an annular notch of the tube. In some instances, the holding means are arranged in only one end of the tube, for example the bottom end.

6 Claims, 3 Drawing Figures

3,865,555

REACTOR FOR CATALYTIC GAS PHASE OXIDATION

BACKGROUND OF THE INVENTION

1. Field of the Invention

This invention relates in general to the construction of a reactor vessel and to contact tubes therefor and, in particular, to a new and useful reactor for catalytic gas phase reaction, which includes a plurality of contact tubes having small size catalytic particles therein with holding means arranged at at least one end of the tube for securing the particles in the tube against withdrawal and which includes a wire gauze and a clamping ring arranged exteriorly of the gauze.

2. Description of the Prior Art

Reactors for catalytic gas phase oxidation are used in the large scale manufacture, for example of phthalic acid and phthalic acid derivatives. Naphthalene in a gas phase flows through a plurality of contact tubes which extend between spaced apart tube sheets and are seated at their respective ends in the tube sheets. The reaction gases are usually directed through the tubes in a heat carrier or a heat transfer medium is circulated over the surface of the tubes. At least a portion, for example a lower portion of the tubes, which is situated in the reaction zone carries a coarse grained catalyst. The reaction gas is preheated in the unfilled portion above the filled portion. In order to prevent the catalyst from falling out of the contact tubes, they have to be provided with gas-permeable holding means. The known holding means are formed by a perforated metal disc which is engaged adjacent the lower end of the tubes. The disadvantage of such construction is that the removal of the discs for replacing the catalysts at regular time intervals is very time-consuming and can lead to the damage of the tube ends and of the metal holding discs. Another type of holding means is a spiral spring which may be easily inserted and removed, but there is a possibility that they may be displaced outwardly due to vibration or sudden pressure increase owing to deflagrations, because the axial forces which do act upon the springs must be absorbed by the frictional engagement between the spring and the inner wall of the tube.

Another holding means is known which is formed by a perforated disc of spring steel having three bent lugs distributed around its periphery which engage in respective notches in the tubes which is located outside or exteriorly of the tube sheets and these discs are pressed against the inner wall of the tubes. A disadvantage is that the notches must be worked in a special working step and that the perforated disc can be mounted and removed only with a special tool. Because of these reasons, they are very expensive in large reactors having several thousands of tubes. In addition, the perforated disc provides a considerable resistance to the gas flowing through the tubes.

SUMMARY OF THE INVENTION

The invention provides a reactor having contact tubes with a catalyst therein which is retained in the tubes by providing holding means which may be mounted and demounted into the tube ends without any costly apparatus and in a simple and inexpensive manner. The holding means comprise a wire gauze skein which is positioned in the tube ends and a clamping ring which is arranged outside of the gauze. The wire gauze skin permits a large flow through volume of about 90 percent of the flow area which compares to about 35 percent for perforated discs so that they will provide only a very low flow resistance to the flow of the reaction gases. A particularly advantageous characteristic is the adequate formation of a boundary surface between the catalyst and the wire gauze. Due to the approximate spherical form, a large boundary surface is provided. The gauze has an irregular surface and a large flow passage and the contact surface between it and the catalyst is very small. There is, therefore, no danger of choking of the opening of the tube which might take place with the use of a perforated disc. The gauze is an improvement over the known spring construction and it affords a good closing action for the catalyst particles against their falling out or being thrown out. With the perforated disc, the clamping effect is very good, but the permeability is poor, but with the spring, the permeability is good, but the clamping effect is insufficient. In both cases, the holding means comprises a single part. The invention, on the other hand, provides a holding means which includes two elements which bring forth the advantages of the known holding means and avoids their disadvantages. The clamping ring may be formed as a spring ring with a square cross-section in order to obtain a large application surface against the inner wall of the tube. The holding pressure created by the spring force acting through a relatively large application surface of the tube affords sufficient security against displacement by concussion or sudden pressure increase in the tubes.

A particular advantage of the embodiment of the invention is one in which a notch is provided in the interior tube wall to accommodate the clamping ring. Such a notch may be rolled into the tube and this may be accomplished in the same operation in which the contact tubes are rolled into the tube plate in order to protect the welding seam against premature break by concussions. The holding means may be arranged on each end of the tube or only in the lower end of the tube in order to secure the catalyst particles against falling outwardly into the force of gravity. If, however, the heating zone is very short, or where the contact tubes are filled with catalyst substantially up to the upper end, the holding means are arranged also in the upper end so that no catalyst particles may be thrown out during the reaction process, for example when deflagrations occur.

Accordingly, it is an object of the invention to provide a reactor having a contact tube bundle where the individual contact tubes are filled with a catalyst and with an improved holding means for holding the catalyst in the tubes which comprises a wire gauze skein and a clamping ring arranged exteriorly of the skein and holding it in position.

A further object of the invention is to provide a reactor construction and catalyst tube therefor which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

GENERAL DESCRIPTION OF THE PREFERRED EMBODIMENTS

Figure 1:
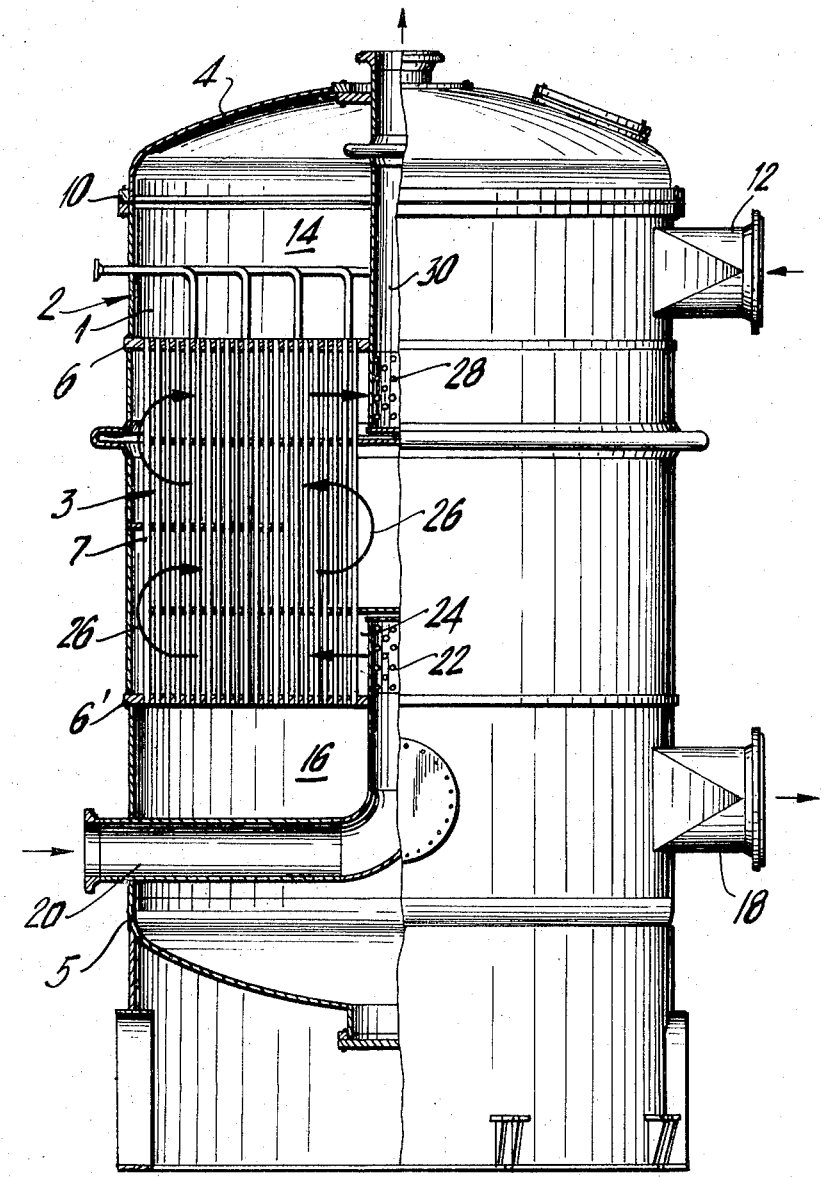
FIG. 1 is a partial elevational and partial longitudinal sectional view of a reactor vessel constructed in accordance with the invention.

Referring to the drawing in particular, the invention embodied therein, comprises a reactor vessel for catalytic gas phase oxidation which includes a cylindrical portion 1 having a tube bundle 3 therein arranged between spaced tube sheets 6 and 6'. The reactor 2 includes a top end wall 4 which is detachably secured to the cylindrical portion 1 by a bolt and flange connection 10 and it also has a bottom or end portion 5 which is welded thereto. A reaction gas inlet fitting 12 is provided at the upper portion for flow of the reaction gases into an inlet chamber 14 and through the individual contact tubes 7 of the tube bundle 3 to an outlet chamber 16 and through an outlet fitting 18. Means are provided for the circulation of a heat carrier or a heat transfer medium through an inlet tube 20 which extends inwardly from a side of the cylindrical portion 1 through the outlet 16 and terminates in a perforated end 22 in the space 24 for flow over the exteriors of the contact tubes 7 in the direction of the solid line arrows 26. The heat carrier is directed through a perforated end 28 of an outlet tube 30 which extends through the top wall 4.

In accordance with the invention, the contact tubes are filled with catalyst particles 9 which, as shown, are relatively small in size in comparison to the diameter of the associated tube 7. The catalyst particles 9 may be arranged to fill the tube 7 to a desired height in accordance with the operating conditions and flow of the reaction gases for the particular process involved. The particles 9 are held against outflow from the tubes 7 by holding means which, in accordance with the invention, comprises a wire gauze skein 8 which is held in position by a clamp in the form of a clamping ring 10'. The holding means are shown as being arranged at the lower ends or bottom of the tube 7 in order to hold the coarse grain catalyst particles 9 against falling out by gravity or other influences and, in some instances, the holding means are also desirable at the other or upper end of the tubes.

Figure 2:
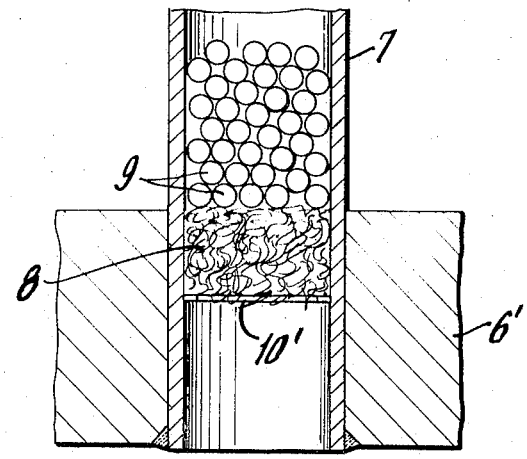
FIG. 2 is an enlarged sectional view of an end portion of a contact tube having holding means for retaining the catalyst particles therein, constructed in accordance with the invention.

As shown in FIG. 2, the clamping ring may be tightly fitted within the tube with a friction fit or it may be made resilient so as to engage against the interior surface with a spring holding action. In some instances, it is preferable to make the ring 10' of a square configuration so that it has a maximum surface in frictional engagement with the interior of the tube 7.

Figure 3:
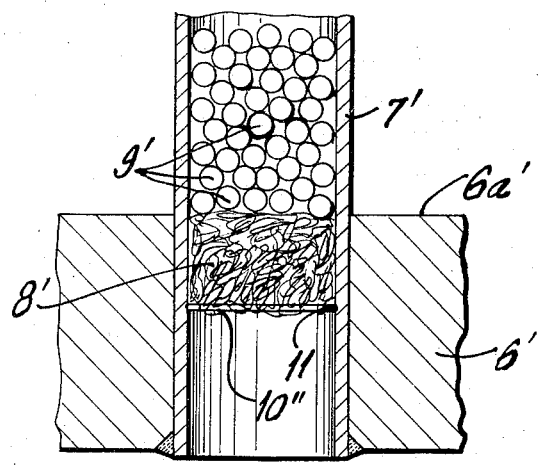
FIG. 3 is a view similar to FIG. 2 of another embodiment of holding means.

In the embodiment shown in FIG. 3, a tube 7' is filled with coarse grain catalyst material 9' and held against removal by a holding means which includes a wire gauze 8' and a clamping ring 10" which is engaged into an annular groove 11 of the tube at its spaced location from its end. In the arrangement shown, the wire gauze 8' forms a skein having a top boundary area which is arranged generally even with the inside 6a' of the tube sheet 6'. The small notch 11 may be formed at the same time as the tube 7 is rolled into the tube sheet 6'. The mounting and demounting of the clamping ring may take place by means of a conventional plier that engages in the two bores in both ends of the slotted clamping ring. The clamping ring 10" is advantageously slotted and made to a slightly oversize diameter so that it can be contracted slightly and permitted to expand into the groove 11 with a tight fit.

While specific embodiment of the invention have been shown and described in detail to illustrate the application of the principles of the invention, it will be understood that the invention may be embodied otherwise without departing from such principals.

What is claimed is:

1. A reactor comprising first and second spaced tube sheets, a tube bundle of contact tubes extending between and having respective ends seated in said tube sheets, means for directing a heat carrier medium over the surfaces of said tube sheets in heat exchange relationship therewith, means for directing reaction gases through said contact tubes, coarse grain catalyst particles arranged in said contact tubes, said tubes having interior walls with an annular groove adjacent at least one end, and holding means arranged adjacent said at least one end of said tubes for retaining said catalyst particles therein and including a wire gauze skein ball disposed across said tube adjacent to and interiorly of said groove, and a clamping ring arranged at the exterior of said gauze in said groove and projecting into the interior of said tube for retaining the gauze in position therein.

2. A reactor, according to claim 1, wherein said clamping ring has a rectangular cross-section.

3. A reactor according to claim 1, wherein said holding means are located only in the lower ends of said contact tubes.

4. A reactor according to claim 1, wherein said holding means are arranged in each end of said contact tubes.

5. A contact tube for a catalyst reactor comprising a tubular member adapted to be seated in a tube sheet at each end and having catalyst particles arranged therein, said tubular member having an interior wall with an annular groove adjacent at least one end, and holding means arranged adjacent said at least one end of said tubular member for retaining particles therein and including a wire gauze skein disposed across said tubes adjacent to and exteriorly of said groove, and a clamping ring arranged at the exterior end of said gauze in said groove and projecting into the interior of said tube for retaining the gauze in position.

6. A contact tube for a catalyst reactor according to claim 5, wherein said wire gauze skein comprises a ball of wire gauze filling the space of said tube exteriorly of said catalyst particles, said clamping ring comprising a split resilient ring engaged in said groove.

* * * * *